O. T. BAKER.
Brake for Wagons.
No. 219,431. Patented Sept. 9, 1879.
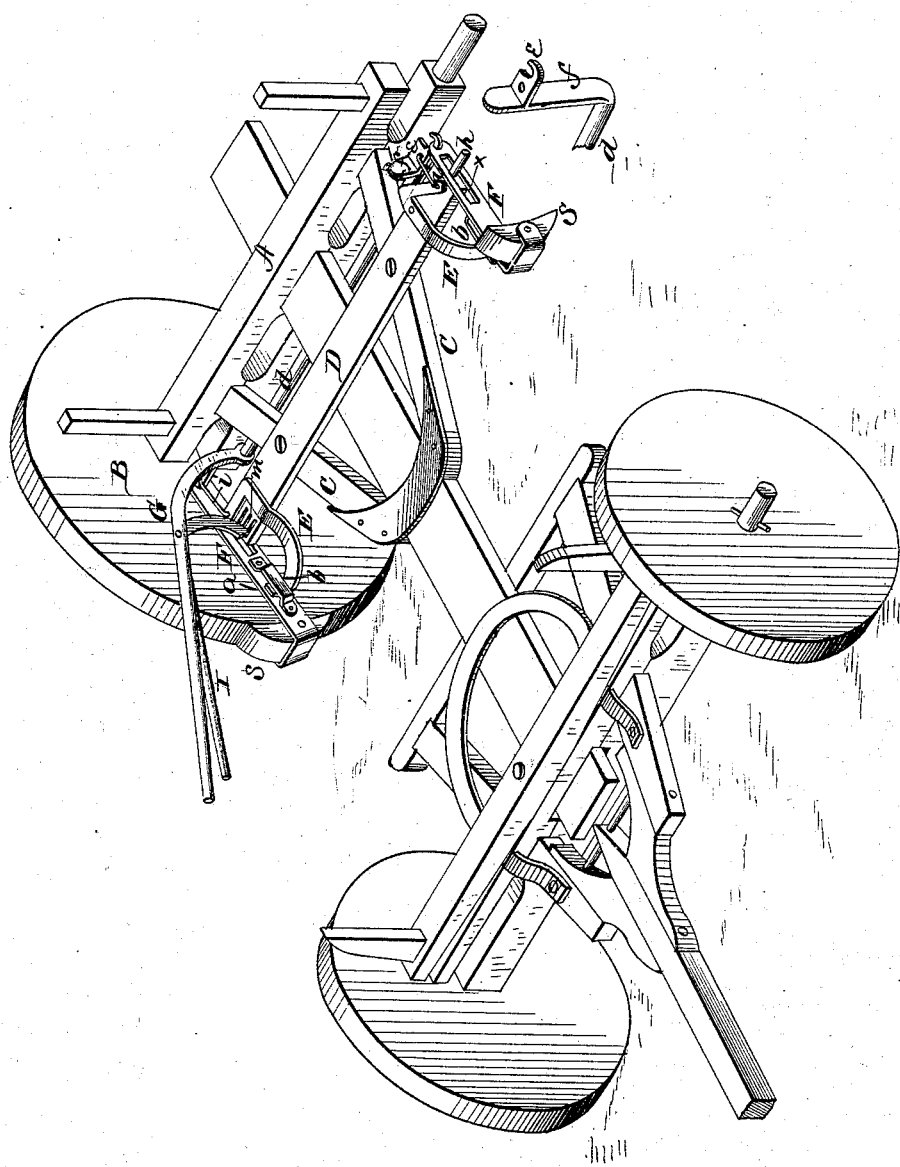
WITNESSES
Franck L. Ouvraud
J. J. McCarthy
INVENTOR
O. T. Baker
Alexander Mason
ATTORNEYS

UNITED STATES PATENT OFFICE.

OWEN T. BAKER, OF WAMEGO, KANSAS.

IMPROVEMENT IN BRAKES FOR WAGONS.

Specification forming part of Letters Patent No. 219,431, dated September 9, 1879; application filed June 24, 1879.

*To all whom it may concern:*

Be it known that I, OWEN T. BAKER, of Wamego, in the county of Pottawatomie, and in the State of Kansas, have invented certain new and useful Improvements in Wagon-Brakes; and do hereby declare that the following is a full, clear, and exact description thereof, reference being had to the accompanying drawing, and to the letters of reference marked thereon, making a part of this specification.

The nature of my invention consists in the construction and arrangement of a wagon-brake, as will be hereinafter more fully set forth.

In order to enable others skilled in the art to which my invention appertains to make and use the same, I will now proceed to describe its construction and operation, referring to the annexed drawing, which represents a perspective view of the running-gear of a wagon with my brake applied thereto.

A represents the hind axle of a wagon, with a wheel, B, on each end. C C are the rear hounds, connected to the hind axle in the usual manner. D is a cross-bar, secured on top of the hounds C C, as shown. On top of the cross-bar D, near each end, is pivoted a curved and bent lever, E, the forward end of which is turned upward to form a lip or tongue, $a$. This lip or tongue extends upward into a loop or staple, $b$, on the side of a stirrup, F, which has its forward portion bent outward and backward to receive the brake-block or brake-shoe S, pivoted therein.

In suitable bearings under the rear ends of the hounds C is placed a rocking shaft, $d$, which is at each end provided with an upwardly-projecting arm, $f$, and on this arm, near the end, is formed an outwardly-extending hook, $e$.

The rear end of the stirrup F is connected to the hook $e$, and said hook is further, by a link, $i$, connected with the rear arm of the lever E.

G is a lever, secured on the shaft $d$ and bent forward, as shown. By pulling this lever upward the shaft is turned in its bearings so that the arms $f$ will, by means of the links $i$, turn the levers E, so as to throw the forward ends of the stirrups F outward, bringing the brake-shoes directly in front of the wheels B. At the same time the arms $f$ pull back the stirrups, so as to apply the brake-shoes to the wheels. The stirrups are each held by means of a pin, $h$, projecting from the end of the cross-bar D through a slot, $x$, in the stirrup.

To the side of the lever G is pivoted another bent lever, I, the lower end of which enters a ratchet, $m$, formed on or attached to the top surface of the bar D, whereby the brake-shoes are held firmly against the wheels. By a pressure of the hand on the levers the brakes are relieved, and by throwing the levers forward the brakes are thrown inward out of the way, free from any mud and dirt that may accumulate on the wheel.

It will be noticed that in my brake there is no fixture whatever connected to the wagon-box. The brake-blocks are out of the way of all mud, and a great or compound leverage is obtained for applying the brakes.

Having thus fully described my invention, what I claim as new, and desire to secure by Letters Patent, is—

1. The combination of the shaft $d$, with arm $f$, link $i$, bent lever E, with lip $a$, and the stirrup F, carrying the brake-shoe S, and provided with the loop or staple $b$, substantially as and for the purposes herein set forth.

2. The combination of the shaft $d$, having arm $f$, with hook $e$, the slotted stirrup F, carrying the brake-shoe S, and the pin $h$, substantially as and for the purposes herein set forth.

In testimony that I claim the foregoing I have hereunto set my hand this 9th day of June, 1879.

OWEN T. BAKER.

Witnesses:
JOHN GEORGE ZEPF,
ROBERT BEATTIE.